United States Patent [19]

Frees

[11] 4,287,966
[45] Sep. 8, 1981

[54] INDUSTRIAL TRUCK

[75] Inventor: Kenneth A. Frees, St. Charles, Mo.

[73] Assignee: Missouri Research Laboratories Inc., St. Charles, Mo.

[21] Appl. No.: 958,166

[22] Filed: Nov. 6, 1978

[51] Int. Cl.³ .............................................. B66B 9/20
[52] U.S. Cl. ................................... 187/9 R; 280/408; 180/14 R
[58] Field of Search ............... 187/9 R, 9 F; 414/495, 414/482, 483, 631; 280/408, 410, 415 A; 180/14 R, 77 C, 77 HT, 19 R

[56] References Cited

U.S. PATENT DOCUMENTS

| | | | |
|---|---|---|---|
| 2,804,174 | 9/1957 | Chasar | 187/9 R |
| 2,925,149 | 2/1960 | Hughson | 187/9 R |
| 3,016,973 | 1/1962 | Williamson | 187/9 E |
| 3,207,085 | 9/1965 | Barr | 187/9 R |
| 3,515,233 | 6/1970 | Stammen | 187/9 E |
| 3,814,272 | 6/1974 | Spratt | 187/9 R |
| 3,876,024 | 4/1975 | Shieman | 180/19 R |
| 3,933,224 | 1/1976 | Nilsson et al. | 187/9 R |
| 4,043,472 | 8/1977 | Hoyt | 187/9 R |
| 4,147,227 | 4/1979 | Lely | 180/77 C |

FOREIGN PATENT DOCUMENTS 1436597 5/1976 United Kingdom ............... 187/9 R

Primary Examiner—Robert J. Spar
Assistant Examiner—Kenneth Noland
Attorney, Agent, or Firm—Kalish & Gilster

[57] ABSTRACT

A compact industrial truck includes a chassis having a power unit at the front and a single steerable drive wheel under the power unit. A pair of nonsteerable wheels is located at the rear of the chassis. Rearward of the power unit is a platform upon which an operator may stand while operating the truck, there being a steering arm interconnected with the drive wheel and accessible by the operator. A fork lift assembly is carried at the rear of the chassis and has a pair of forks extending rearwardly for lifting palletized loads, there being a fork actuation device preferably in the form of a hydraulic cylinder for selectively raising and lowering the forks. A coupler can be carried at least at one end of the chassis, and optionally at both ends, for coupling a trailer to the truck independently of the fork lift assembly. Control devices are accessible to the operator from the platform for controlling both the movement of the wheel and the raising and lowering of the forks.

22 Claims, 12 Drawing Figures

INDUSTRIAL TRUCK

BACKGROUND OF THE INVENTION

The present invention relates to industrial trucks, and more particularly, to a compact industrial truck including both a fork lift assembly and a coupler carried at least at one end of the chassis for coupling a trailer to the truck independently of the fork lift assembly.

A great variety of industrial trucks equipped with fork lift devices have been proposed, ranging from relatively large four-wheel electric fork lift trucks of the general type disclosed in Schenkelberger U.S. Pat. No. 3,148,871 to compact fork lift trucks having a steering arm-controlled power traction unit and a fork lift apparatus extending from the body of the truck adapted for being controlled by an operator standing adjacent the truck, as disclosed in Gibson U.S. Pat. No. 2,942,679. Representing an intermediate range of fork lift trucks including a platform upon which an operator may stand while operating the truck is the apparatus disclosed in Ayers U.S. Pat. No. 2,885,016.

Electric or internal combustion engine-driven industrial trucks of this general character have been also used heretofore for pulling a trailer, or a string of trailers, by coupling the same to one end of the truck in one or another of different ways. For example, representative of the disclosure of such units are the U.S. Pat. Nos. to Ulinski 3,074,500; Christensen 3,944,258; and Burger et al 1,715,815.

A small, compact industrial truck known as a "tugger" and suited for having one or more trailers couplere thereto is commercially available from the Clark Company, Industrial Truck Division, Battlecreek, Michigan, 49016 and sold under the registered trademark "Powrworker," e.g., as models 2T-18/2T-18/2THS-12-24. Trucks of this type include a short chassis having a battery-driven electric motor unit at the front of the chassis including a single traction wheel steered by a steering arm manipulated by an operator standing either on a platform at the rear of the truck or on the ground adjacent the device by virtue of a pivotal connection of the steering arm, thereby permitting the arm to be used for control of the truck when the operator is either riding or walking. The end of the steering arm has fingertip controls for controlling forward and rearward movement of the truck. Such tuggers have a coupler at the rear of the truck for coupling of the trailers to the truck.

However, none of these patented or commercial prior art devices effectively combine the advantages of a small, compact industrial tugger with the capability of a fork lift truck for lifting of palletized loads, and while retaining such compactness, permit an operator to control the device either from a platform on the truck of from a position adjacent the unit via use of a walking beam-type steering arm. Moreover, none of the previously known configurations provide control features which could be incorporated in a truck having such a combination of a fork lift assembly and a coupler at one end of the truck chassis so as to permit facile control of both movement of the truck as well as raising and lowering of the forks bearing in mind that movement of the truck necessarily might have to be in either direction.

Characteristically, fork lift trucks are driven with the tines or forks of the fork lift assembly oriented in a forward direction since the operator typically faces toward such forks, and it is more convenient to operate the truck in the direction in which the operator is compelled to stand or to sit while manipulating the controls. On the other hand, for the reasons of safety, it would be quite desirable to operate the truck with the fork facing rearwardly, not only because such arrangement would be less likely to impale pedestrians upon the forks or to strike such pedestrians with loads carried thereon, but also because braking of the truck would not tend to dislodge the load from the forks but rather would ensure that the load remains seated upon the forks in a stable configuration.

SUMMARY OF THE INVENTION

A primary object of the invention is the provision of an industrial truck combining fork lift capability with trailer coupling capability in an extremely small and compact unit.

A further object of the invention is the provision of an industrial truck which can be utilized for lifting and carrying a palletized load while, at the same time, pulling a trailer coupled thereto.

Another object of the invention is the provision of an industrial truck of a small, compact nature permitting operation by an operator standing upon a platform thereof, or, alternatively, permitting operation of the same by operation from a position on the ground adjacent said unit.

A further object of the invention is the provision of a small, compact industrial truck combining coupling and fork lift capabilities which can be operated in both forward and reverse directions with equal ease and facility by an operator on the truck.

Yet another object of the invention is the provision of a small, compact truck having a fork lift unit having nonsteerable wheels which are positioned relative to the fork lift, for minimizing disadvantageous movements upon the truck and conducting to application of lift forces substantially in alignment with said wheels.

Briefly, these and other objects of the invention are provided by a new small, compact industrial fork lift truck having a chassis and an electric motor power unit at the front of the chassis, and including a steerable drive wheel under the power unit. A pair of nonsteerable wheels is located at the rear of the chassis, which carries a platform at the rear for standing of an operator while operating the truck, the platform being rearward of the power unit. A steering control includes a steering arm which extends back towards the platform and is interconnected with the drive wheel, the steering arm being accessible to the operator either from the platform or from a position adjacent the truck. A fork lift assembly is carried at the rear of the chassis and includes a pair of rearwardly extending forks adapted for lifting palletized loads. A hydraulic fork actuation cylinder is positioned in substantial alignment with the rear wheels for selectively raising and lowering the forks. Carried optionally at the front or the rear of the truck is a coupler providing for coupling of a trailer to the truck independently the fork lift assembly. Control means is accessible to the operator from the platform, and preferably also from the end of the steering arm, for controlling the forward and rearward movement of the truck as well as for controlling raising and lowering of the forks.

Other objects and features will be in part apparent and in part pointed out hereinbelow.

BRIEF DESCRIPTION OF THE DRAWINGS

Corresponding reference characters indicate corresponding parts through the several views of the drawings.

DESCRIPTION OF THE PREFERRED EMBODIMENTS

Figure 1:
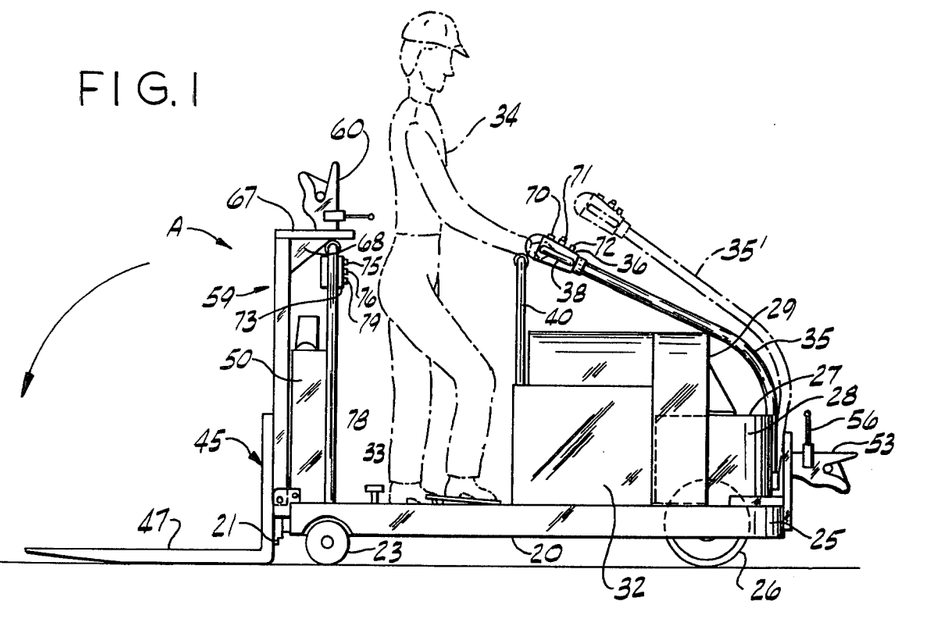
FIG. 1 is a side elevational view of a first embodiment of a new industrial fork lift truck constructed in accordance with and embodying the present invention.
Figure 2:
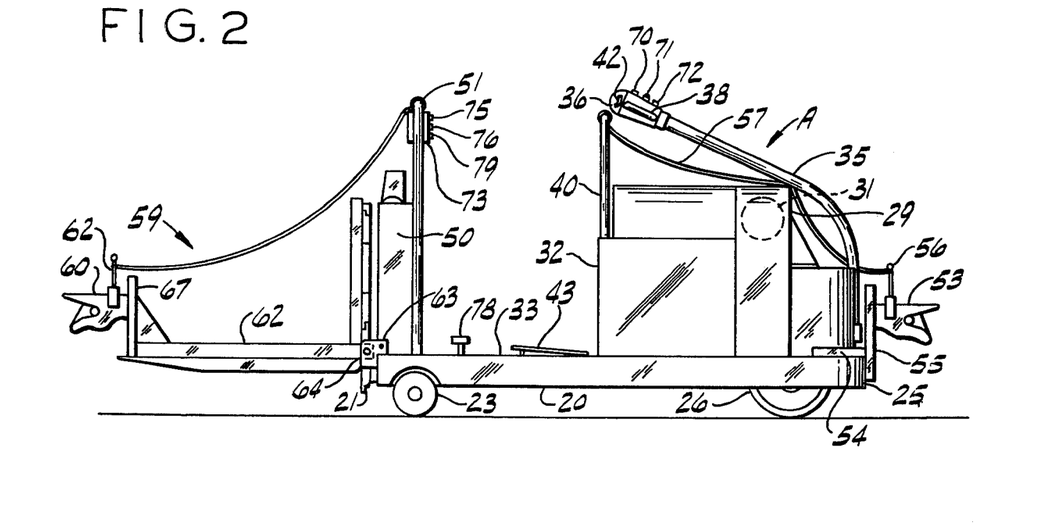
FIG. 2 is a side elevational view of the industrial truck of FIG. 1, but showing a rear coupling assembly thereof in a position for coupling of a trailer to the truck.

Referring now to the drawings, and particularly to FIGS. 1 and 2, there is illustrated a new industrial fork lift truck of a small, compact configuration designated generally A. Said lift truck A comprises a frame or chassis 20 of relatively heavy welded steel construction. At opposite sides of the rear 21 of the frame are nonsteerable wheels 23 of small diameter but essentially heavy duty type for carrying considerable loads, these nonsteerable wheels being located quite closely indeed to the rear 21 of the chassis. Just under the front of the chassis, which is designated 25, is a steerable drive or traction wheel 26 which forms part of a drive or power unit 27 which includes a housing 28 and is journalled for rotation with respect to chassis 20 about a vertical axis 30 (see FIG. 3) for turning of the truck. The power unit 27 includes a series-wound high torque DC motor for driving wheel 26 in either forward or reverse direction and also includes a braking mechanism to be operated as described hereinbelow.

Although the features of drive unit 27 are of commercial design and form no part of the present invention, except as they are controlled in accordance with the features and principles herein disclosed, the truck is to be noted as having an equipment housing 29 including an electric motor and hydraulic pump unit 31 therein for purposes of the invention as described below, and which housing 29 extends the width of the chassis over the drive unit housing 27, which is thus seen to be partly surrounded or covered by housing 29.

Figures 3, 4, 5, 6:
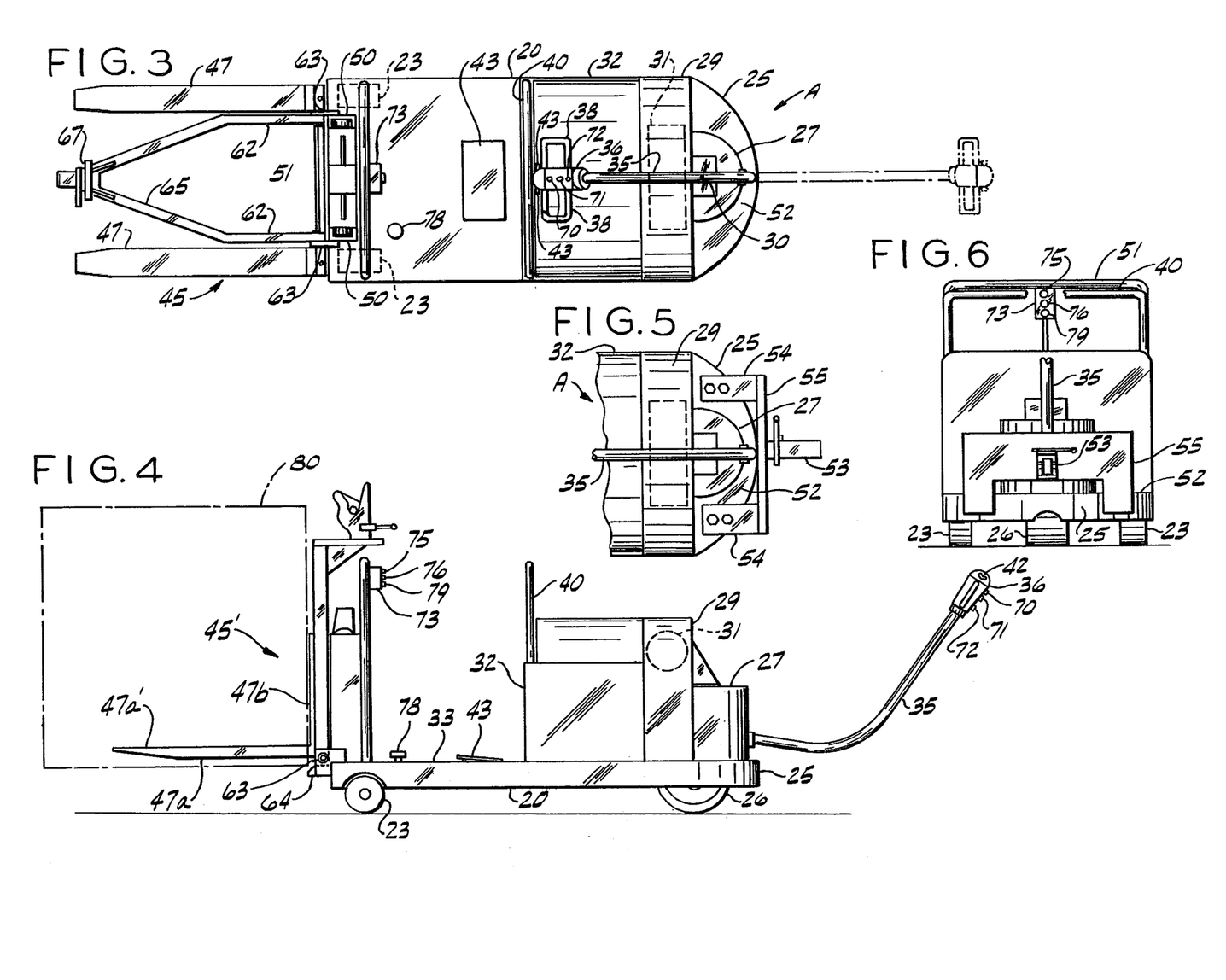
FIG. 3 is a top elevational view of the truck of FIG. 1 with a rear coupler assembly positioned as shown in FIG. 2, but without a front coupler assembly.
FIG. 4 is a side elevational view of a second embodiment of the new truck illustrating the lifting of a palletized load and showing also the movement forward of a steering arm which is made possible when the truck does not carry a front coupling assembly, as in FIG. 3.
FIG. 5 is a fragmentary top plan view of a front portion of the truck of FIG. 1 illustrating a front coupling assembly of the truck, when employed.
FIG. 6 is a front elevational view of the truck provided with said front coupling assembly.

The front of the chassis 25 is of rounded, essentially semi-circular shape in top plan view, as will be seen most clearly from reference to FIGS. 3 and 5, for greater maneuverability of the truck and for increased clearance upon turning about sharp corners.

Electrical power for the power unit 27 and other functions of the truck is provided by batteries of heavy-duty industrial type, such as the lead-acid type or nickel-alkaline type, which are contained within a housing 32 which is located just behind the power unit 27. Rearward of battery housing 32 is a platform 33 extending the width of the chassis upon which an operator 34 may stand, as illustrated, for operation of the truck while riding thereon. Extending upwardly and rearwardly from the front portion of housing 27' of the power unit is a steering arm 35 having at its power unit remote end a control head 36 having features to be described, but presented just above housing 32 for use by the operator 34 in steering and for controlling other operational functions of the truck. Referring to FIG. 3, said control head 36 has a pair of loop-shaped handles 38 extending from opposite sides of the control head for being grasped by the operator at a convenient height and location relative to platform 33 for steering and control purposes. The truck also includes a front hand rail 40 extending upwardly and across the width of battery enclosure 32 at a convenient height for being held by the operator.

Steering arm 35 is pivotally secured at its lower end to power unit 27 to permit movement of the arm in a vertical plane for braking and other purposes described below. However, for the present, it is sufficient to observe that the steering arm is relatively movable at least between the position shown in FIG. 1 and a position indicated by dashed lines and designated 35'. Power unit 27 includes an integral braking mechanism operated upon movement from position 35' to the position in which the arm is shown in position 35' to the position in which the arm is shown in FIG. 1 for application of brakes to the traction motor contained within the power unit. Thus, it is to be understood that for forward movement, operator 34 will cause movement of the arm to its position designated 35'. A spring may be utilized for biasing the arm toward this position in which the brakes are released.

Steering arm 35 is swingable in a horizontal plane through 90 degrees of rotation about axis 30 to either side of the centered position illustrated in the drawings so that the truck has a turning radius which is only slightly greater than its wheel base. But in addition to steering the vehicle, the steering arm may be utilized for controlling rearward and forward movement of the truck. For this purpose, control head 56 is provided with a so-called walking beam fingertip switch 42 which is manipulated in either direction for forward or reverse movement of the truck.

The new truck is, in accordance with the invention, provided also with a so-called deadman control comprising a pedal 43 of rectangular shape pivotally secured relative to the platform at the forward edge of the pedal. Pedal 43 is functionally interconnected with the braking mechanism of power unit 27 in such a way that the pedal is adapted to provide no braking upon weight of the operator applied thereto, but to provide braking upon release of the weight of the operator. Accordingly, should the operator fall or jump from the truck for whatever reason, the braking mechanism will be applied to retard the movement of the truck independently of the positioning of steering arm 35. Such feature permits the use of a spring (not shown) as noted above which may, if desired, bias steering arm 35 to the position indicated at 35' wherein no braking is applied so that the operator need not maintain forward pressure upon the handles 38 of the steering unit for forward movement of the truck, so long as his weight is present upon pedal 43. Alternatively, pedal 43 may be interconnected in a manner to provide braking only when depressed, thereby to permit an additional braking control independently of the movement of steering arm 35. But, in either case, the pedal is adapted to provide braking dependent upon the weight of the operator applied to it.

At the rear 21 of the truck is provided a fork lift assembly designated generally in its entirety 45. This assembly includes a pair of forks 47 of L-shaped configuration, each extending rearwardly from the truck for engagement with a pallet, for example. Mechanism 45 is, therefore, adapted for lifting a palletized load by means of said forks 47. Said fork lift assembly 45 includes a hydraulic actuation cylinder 48 (see FIG. 9) which is positioned between a pair of frame rails 50 which are described in greater detail hereinbelow.

Extending upward along each frame rail 50 are vertical portions of a hand rail 51 which includes a horizontal portion extending across the rear of the truck at the approximate same height as hand rail 40 for use by the operator when racing rearward, serving to prevent the operator from falling forward and for safety purposes in general.

The vehicle is also equipped with a coupler means carried at either or both ends of the chassis 20 for coupling a trailer to the truck independently of the fork lift assembly 45. In FIGS. 1 and 2, truck A is shown provided with two couplers. A first coupler 53 is secured to the front 25 of the chassis by means of an arrangement comprising a pair of frame members 54, each of which is bolted or welded to the upper surface 52 of the front of the truck and extends forwardly therefrom. A yoke-shaped bridging member 55 extends transversely across the front of the vehicle and interengages the forward extension members 54. Said bridging member 55 and extension members 54 are preferably of heavy steel stock for strength and rigidity.

Coupler 53 extends forwardly with respect to the longitudinal axis of the truck and is centered laterally with respect to the truck on said bridging member 55, being preferably welded thereto. Coupler 53 may be of any commercially available design, such as a so-called universal coupler, eye coupler, or a so-called hook, pin, and eye coupler but, in any event, is placed at a convenient height for interengagement with the usual coupling rings of a standard industrial trailer of small size intended for being pulled by vehicles of the present character. The coupler illustrated is of the universal type, and includes an actuator arm 56 which may be operated for opening the coupler to release a trailer or the like coupled thereto. For this purpose, the vehicle may be equipped with a lanyard 57 which extends between said arm 56 and the front rail 57 whereby it may be conveniently reached by the operator for coupling and uncoupling purposes.

Truck A is also equipped with the coupler assembly designated generally 59 at the rear 21 of the chassis. Said coupler assembly comprises a coupler 60 of the universal type shown at the front of the vehicle, even though it could be of one of the other above-mentioned conventionally available types of couplers. Said coupler assembly 59 comprises a pair of arms each pivotally connected at one end to the rear 21 of the truck chassis by means of respective pivots constituted by brackets 63 which are welded to the chassis. Said pivots or brackets, preferably each may include a suitable extension 64 for engaging the lower end of each arm to prevent swinging movement of the arm downward beyond the position shown in FIG. 2. Thus, each extension 64 acts as a stop to limit pivoting movement of the arms 62. The arms each extend rearwardly from their respective pivots 63, parallel to each other and to the longitudinal axis or centerline of the truck but then have converging terminal portions 65 which are remote from the pivots. The pivots are seen to be spaced between the forks, as said forks normally are positioned, all as viewed in FIG. 3. Hence, in the rearwardly extending lowered position, arms 62 lie in a generally horizontal plane. The converging ends 65 have secured to them the lower end of a vertical plate, there being preferably also a pair of gussets or stiffeners 68 interengaging the rear of said plate 67 and each of arms 62 for stiffening purposes. Said plate 67 carries coupler 60 offset above the plane of arms 62 with said coupler welded or otherwise suitably secured to and extending rearwardly from the vertical plate whereby it is presented, at approximately the same height as coupler 53, for facile coupling of a small industrial trailer thereto. Again, the coupler 60 includes an actuator lever 62 for actuating the locking mechanism of the coupler and a lanyard 63 may extend advantageously between said arm 62 and rear hand rail 51 for facilitating operation of the coupler by the operator from platform 33.

The entire rear coupler assembly 59 is thus adapted to swing between the positions shown in FIGS. 1 and 2 so that, as illustrated in FIG. 1, the coupler assembly is conveniently stowed in a vertical position where it does not interfere with the lifting and carrying of a palletized load by the fork lift mechanism. An appropriate latch or other spring mechanism of each pivot bracket 53 or other suitable mechanism may be used to retain the assembly in the vertical stowed, or raised, position illustrated in FIG. 1. However, the entire mechanism readily pivots downward as shown by the arrow in FIG. 1 to occupy the position illustrated in FIG. 2, without interfering with the forks 57.

Highly efficacious controls are incorporated in the new truck for permitting the operator 34 to operate the fork lift assembly 45 as well as to control movement of the vehicle either from platform 33 or from a position adjacent and generally in front of the vehicle. For this purpose, steering arm control head 36 is provided with a plurality of pushbuttons which operate electrical switches to operate the hydraulic actuation mechanism, which includes an electrically driven pump 68 which is located within the control housing 29. (See FIGS. 2 and 3). Said electrically driven pump apparatus 31 is of a commercially available design, having an electric motor which may be powered by the batteries contained within battery housing enclosure 32 and is, therefore, not specifically described.

For the purposes of controlling the hydraulic unit 68, control head 36 is provided with electrical switch pushbuttons 70,71 constituting a first set of controls for raising and lowering, respectively, the forks 47. In addition, control head 36 may include also a conventional horn button 72. Hence, it is to be understood that the operator 34 may, by manipulation of pushbuttons 70,71, raise or lower the forks 47 to pick up or lower a palletized load.

The new truck is also provided with a second set of controls which are to be used by the operator when facing rearward upon platform 33. These controls include a plurality of electrical switch pushbuttons which are contained within a suitable housing 73 which is positioned just below hand rail 51 and centered with respect to its vertical legs. Said housing contains pushbuttons 75,76 for respectively raising and lowering of forks 47, it being understood that the switches controlled by these two pushbuttons are also adapted to control hydraulic power unit 31. Accordingly, the operator while facing rearward upon platform 33 may effect raising and lowering of the forks 47 with a palletized load thereon while in a position to observe closely the proper operation of the forks 47 and without having to reach, in a possibly awkward or unsafe manner, pushbuttons 70 or 71.

The new truck is equipped also so that it is capable of being operated at speeds other than those controlled by operation of the fingertip walking beam-type control 42 upon control head 36. It is to be understood that such control typically will provide first and second speeds either in the forward or reverse direction which speeds typically may be quite low as, for example, about 1.5 m.p.h. to 2 m.p.h., whereas, with the trailer being pulled by the truck or with a palletized load having been picked up by forks 47, it may be desirable to operate the truck at a higher speed, such as, about 5 m.p.h. For this purpose, platform 33 is provided with a control button 78 which the operator may step on while upon platform 33 and while manipulating control head 36 to cause movement at such higher speed in either forward or rearward directions. It may be desirable to pull a trailer from coupler 53 while truck is being driven in a rearward direction in which the operator faces toward the rear 21 of the truck. For facilitating such operation, control enclosure 73 is provided also with an additional switch pushbutton 79 which may be depressed to cause the third speed or high speed capability of the truck to be realized. Hence, it is to be appreciated that the operator while facing rearward may cause the vehicle to be driven in a rearward direction while continuing to steer the vehicle while grasping one of the handles 38 of the steering arm, but may cause the vehicle to move at its highest speed by depressing either the pedal 78 or pushbutton 79.

Although the new truck may be provided with a front coupling as illustrated in FIGS. 1 and 2, such front coupling may, under some conditions of use, be omitted. Thus, FIGS. 3 and 4 illustrate variations of the truck wherein no front coupling is installed. More specifically, FIG. 3 illustrates embodiment A without such coupling whereas FIG. 4 illustrates a second embodiment B of the new truck including a different fork lift assembly, there designated 45'. While said fork lift assembly is to be described below in greater detail, it is to be noted that both the embodiments depicted in FIGS. 3 and 4 do not incorporate a front coupler. When this configuration exists, steering arms 35 may be swung forward to the position shown in FIG. 4, and as shown in phantom in FIG. 3, wherein control head 36 is conveniently presented for manipulation of the controls by the operator when standing in front of the truck. There, it is to be observed, that the pivotal connection of steering arm 35 with power unit 27 permits the arm to extend forwardly from the power unit for steering of the drive wheel 26 in the same manner as when the operator occupies the platform 33, by swinging of control arm 35 to either side. In addition, the walking beam control 42 for controlling movement of the truck is easily manipulated by the operator for controlling forward or rearward movement of the truck at its first and second slow speeds. Yet pushbutton controls 70,71 for respectively raising and lowering the fork lift assembly 45 of embodiment A or 45' of embodiment B remain conveniently presented for facile operation by the operator, permitting the truck to be steered into position under a palletized load such as that shown in phantom at 80 in FIG. 4, and the forks then raised to the position illustrated upon depressing pushbutton 70. Movement of the truck is thus permitted in either direction at a walking speed, i.e., the maximum speed permitted by manipulation of speed control 42 (typically 1.5–2 m.p.h.), as noted.

It is to be observed that pedal 43 is not operative to apply braking force to traction wheel 26 if steering arm 35 is in the position shown, i.e., in which it is pivoted forward. However, the braking mechanism within power unit 27 is such as to apply brakes to wheel 26 in response to the weight of arm 35. Therefore, the operator must lift the arm slightly to release the brake so that movement of the truck may occur.

By virtue of the new controls and features of the truck, directional movement of the truck is conveniently controlled by the operator regardless of whether forward or rearward since the operator may have control over all functions while facing either toward the front or the rear of the truck. Additionally, the coupling features independent of the operation of the fork lift assembly permits a trailer to be towed while retaining the fork lift capability of the truck.

Figure 7:
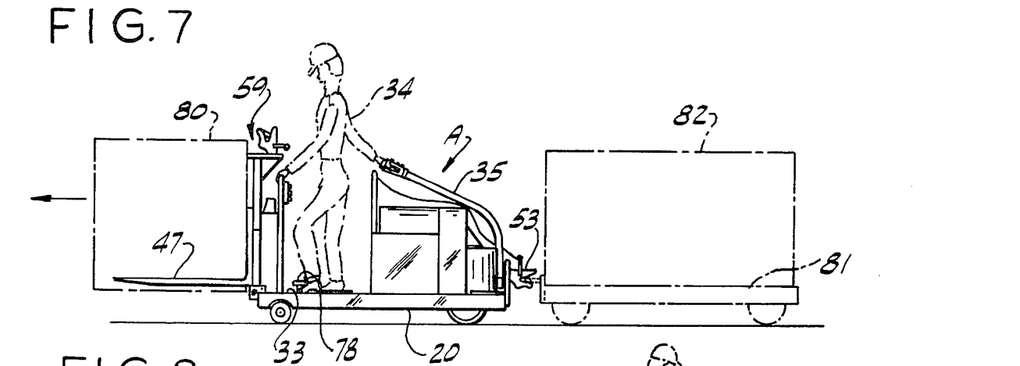
FIG. 7 is a side elevational view of the first embodiment of the new truck illustrating the carrying of a palletized load by a fork lift assembly of the truck while pulling a trailer connected to a coupling at the front of the truck, the truck being driven in the rearward direction.

Thus, FIG. 7 illustrates a truck of embodiment A pulling a trailer of a conventional industrial type having a load 82 thereon with the trailer being coupled to the front coupler 53 while at the same time a load 80 is supported by forks 47 of the fork lift assembly with the truck being driven in a rearward direction. There, it may be noted that the operator 34 may by means of one arm control steering arm 35 or control the steering of the truck while facing in a rearward direction, in which direction the truck is being driven. But concurrently the operator may, either by depressing the high speed control 78 upon the platform 33 or by manipulating pushbutton 79, cause the truck to be accelerated to its highest speed.

Figure 8:
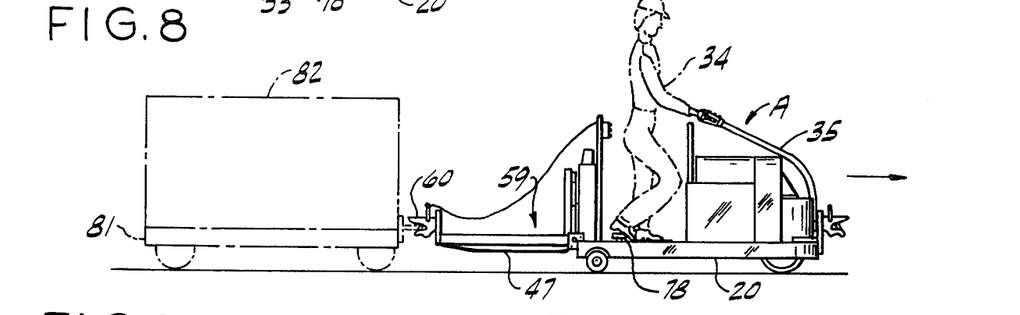
FIG. 8 is a side elevational view of the first truck embodiment but with the truck shown pulling a trailer from a coupling carried at the rear of the truck, the truck being driven in a forward direction.

FIG. 8, on the other hand, depicts the rear coupling unit 59 in its lowered position presenting coupler 60 at a height convenient for coupling of a trailer 81' thereto, said trailer having again a load 82 of appropriate weight upon the trailer to be pulled by the truck with the truck moving then in a forward direction with the operator 34 facing forward, in which position the operator may conveniently steer the truck by manipulation of arm 35 and, if desired, depress high speed control 78, as indicated, to accelerate the truck to its maximum speed.

Figure 9:
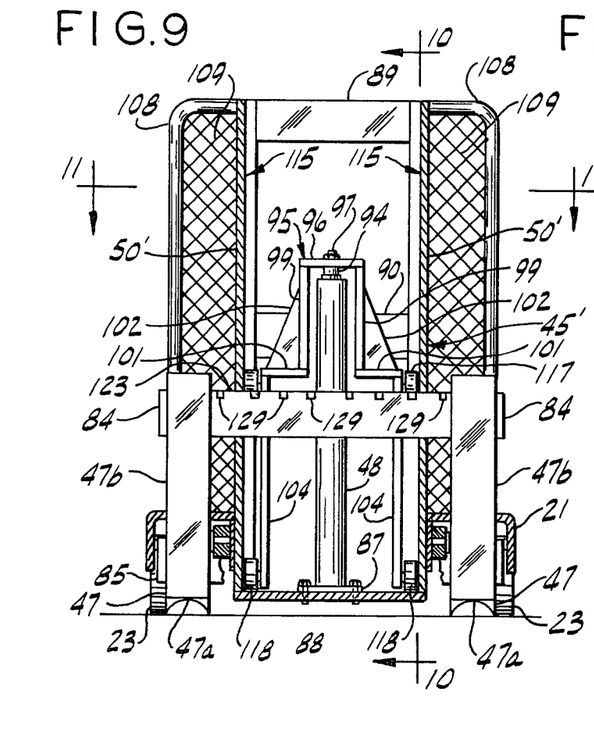
FIG. 9 is a rear elevational view of a fork lift assembly of the truck, embodiment of FIG. 4 portions thereof being broken away for the purpose of illustration.

The hydraulic fork lift mechanism 45 with which truck embodiment A is shown to be equipped is adequate to provide a lift height of the forks 47 of approximately twelve inches. But higher lifting capability may be desirable in some applications. For this purpose, a somewhat modified hydraulic lift unit 45' is employed in connection with embodiment B. Although the principal features and functions of both lift mechanisms 45 and 45' are substantially identical, FIGS. 9-12 illustrate the specific construction of the second embodiment. Referring then to FIG. 9, a rear view of the fork lift assembly 45' of embodiment B, depicted in FIG. 4 is shown with certain portions of the fork lift assembly and truck being broken away in order to more clearly show the features of the fork lift assembly. Said assembly 45' is shown to include forks 47 which are of the configuration previously disclosed, each being an L-shaped member having a horizontal portion 47a constituting a lifting member which is tapered to a thin distal edge 47a' along its lower surface and an upright or vertical portion 47b which is joined integrally with the horizontal portions 47a at a bend 47c.

Interengaging upright portions 47b of the forks are a pair of elongated horizontal members 84, 85, each of which extends laterally substantially the width of the truck. Both the upper lateral member 84 and lower lateral member 85 are adapted to be lifted or lowered by hydraulic cylinder 48 which is seen to include a flanged base 87 which is bolted to a lateral plate 88 extending between a pair of side rails 50' which correspond to rails 50 of fork lift assembly 45, as shown in FIGS. 1-3 but being of somewhat greater height. Rails 50' are interconnected at their upper ends by an elongated horizontal member 89. A further elongated horizontal member 90 interconnects the rails 50' at approximately the midpoint of their height. Rails 50' and the bridging horizontal members 88-90 are joined as by welding to form an integral unit which is designated generally 92. Unit 92 is preferably welded to the rear 21 of the truck chassis 20, as best viewed in FIG. 10.

Figure 11:
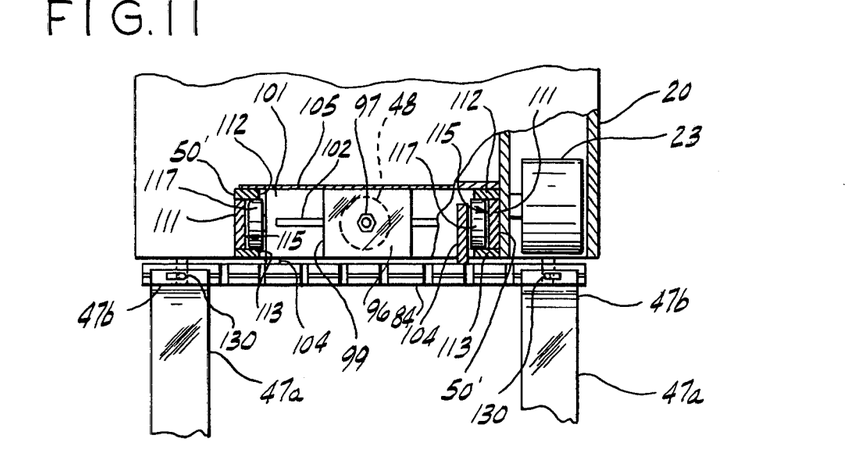
FIG. 11 is a cross-sectional view taken along line 11—11 of the fork lift assembly.

Extending upwardly from hydraulic cylinder 48 is an actuator or extension 94 which will extend further from hydraulic cylinder 48 upon the introduction of hydraulic fluid under pressure to the cylinder. Carried by said actuator 94 is a yoke 95 comprising a relatively short horizontal plate 96 (See FIG. 11) which is bolted as indicated at 97 to the actuator 94. Yoke 95 comprises a pair of elongated vertical members 99 which extend downwardly from member 96, being preferably welded thereto and which, in turn, have horizontal members 101 each extending outwardly therefrom toward rails 50'. The yoke also includes gussets 102 of triangular shape which interengage members 99,101 on each side of the cylinder for strengthening and stiffening purposes. Extending downwardly from the outer edges of horizontal members 101 of the yoke are a pair of vertical members 104 to which the previously identified transverse or lateral members 84,85 of the fork assembly are secured as preferably by welding. The rail or frame unit 92 is closed across the rear by a relatively thin sheet 105 of flat stock of which may be welded at its lower end, as indicated at 106, to platform 33 and, at its upper end, to transverse member 89 for safety purposes. Additionally, it is to be observed that hand rails 108 extend upwardly from each side of the platform on opposite sides of this assembly, being joined to the outer surfaces of rails 50' as shown in FIG. 11. The space between each of these rails and its adjacent rail 50' of the lift assembly is spanned by steel mesh material 109 to provide even more protection for the operator.

With reference again to FIG. 11, it is to be observed that each of rails 50' is of channel section, each channel opening toward the other. Even though the front web of each rail 50' is not shown in FIG. 9 for purposes of illustration, each rail 50' of the fork lift assembly comprises a main web 111 from which a rear flange 112 and front flange 113 extend from web 111 to define a channel opening toward the hydraulic cylinder. Also, in FIG. 11, the front flange 113 is shown cut away for purposes of illustration but each rail 50' is thus seen to define a channel 115. Carried by each of the vertical members 104 of the yoke are a pair of rollers 117,118, each set of which is fitted within a corresponding said channel 115. The rollers 117,118 of each member 104 of the yoke are journalled for rotation so that the rollers will rotate upon movement of the yoke in response to extension of the hydraulic cylinder actuator 94.

Figure 10:
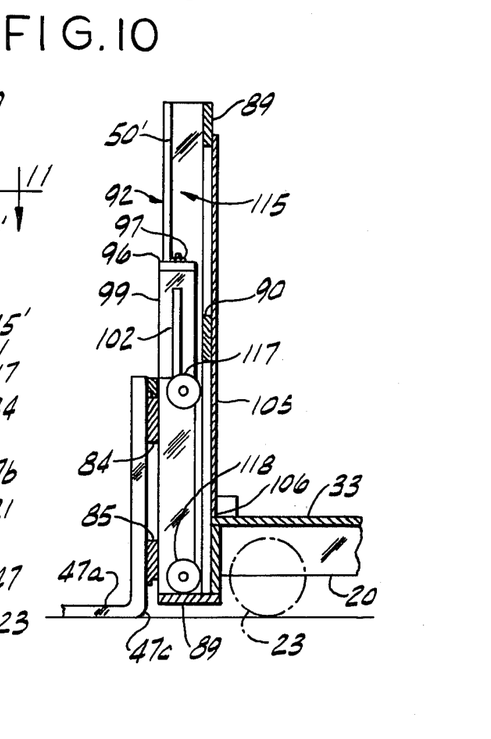
FIG. 10 is a cross-sectional view taken along line 10—10 of FIG. 7.
Figure 12:
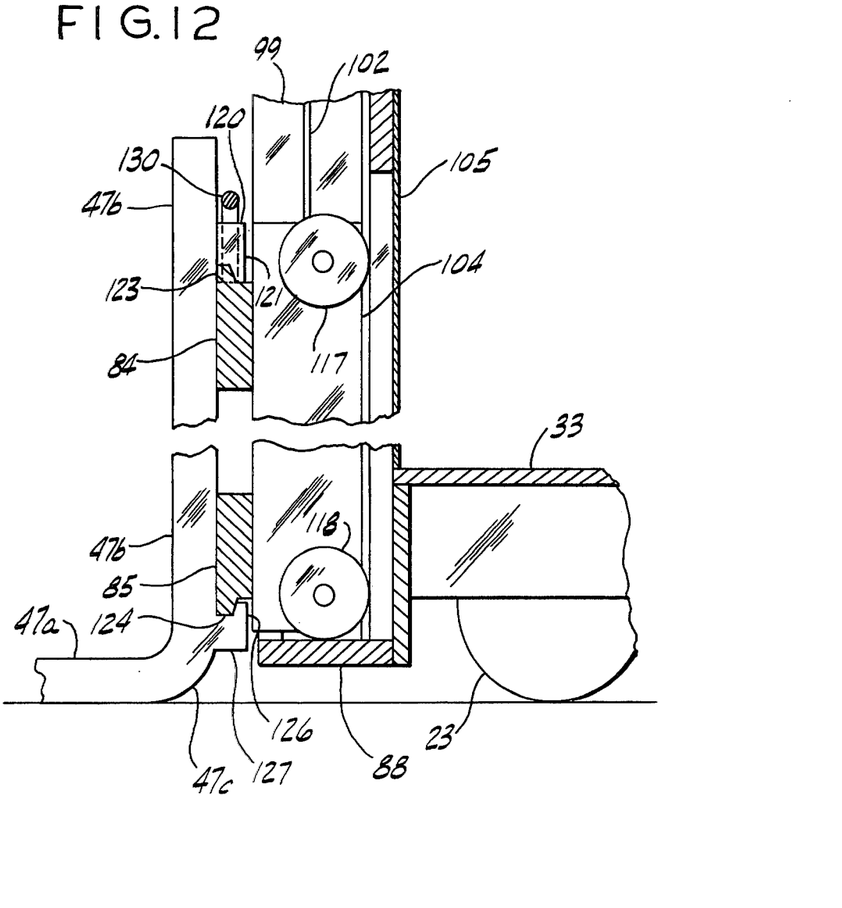
FIG. 12 is a fragmentary cross-sectional view of elements depicted in FIG. 8, but in enlarged scale to illustrate a fork supporting apparatus of the lift assembly.

Therefore, it should be manifestly apparent from FIGS. 10-12 that the fork lift assembly is secured to the truck in an extremely simple and effective manner in which the hydraulic cylinder is aligned essentially in a transverse sense, with respect to the truck, with rear wheels 23. This ensures that the forces which provide lifting of forks 47 will be applied substantially over the rear wheels to avoid creating an excessive moment rearward of the truck which might attempt to raise or excessively lighten the front 25 of the truck from the ground upon lifting of a heavy load by the forks.

Although the drawings illustrate detailed features of fork lift mechanism 45' employed with embodiment B, it is manifestly apparent that the same principles apply to the fork lift mechanism 45 and the same is constructed with functionally identical components and features but is shorter in character so that the rails 50 do not have the height of the rails 50' of unit 45'. And in all respects, operation and features, including the hydraulic cylinder, are the same, though the cylinder is of shorter height, and operate in exactly the same way, including an identical yoke which lifts the fork 47 through the requisite range of movement, such range being about twelve inches for embodiment A and about twenty-four inches for embodiment B. Therefore, there is no need to specifically describe the same features which are present in fork lift unit 45, and in view of the greater scale provided by the taller hydraulic lift unit 45', the unit provided for embodiment A will be well understood.

Referring to FIGS. 10 and 12, each vertical leg 47b of the forks is secured to the elongated transverse members 84,85 which are carried by yoke 95 by means of interengaging lips. Thus, it will be seen that vertical leg 47d of each fork is provided with a rearward extension 120 having a lip 121 which extends downwardly along its rearward edge. This lip 121 engages the corresponding lip 123 of the elongated lateral member 84 for supporting the fork from the lateral member 84. In a similar manner, the lower lateral member 85 of the lift assembly is provided with a lip 124 along its rearward lower rear edge and extending along the length of said member 85. This lip is engaged by a corresponding lip 126 of a rearward extension 127 of the fork. Therefore, it will be apparent from FIG. 12 that the fork vertical leg 47b is retained securely with respect to members 84,85 of the lift unit and may be spaced laterally as desired along the lateral members. For the purpose of locking each fork vertical leg 47b to the lateral members when the retainer or support lips are secured as illustrated in FIG.

12, the upper lateral member is provided (See FIG. 10) with a plurality of notches 129 which are evenly spaced along the upper lip 123 and are each of rectangular shape. Each upper fork leg extension 121 carries a suitable securement mechanism, such as a shot pin 130 shown in FIG. 12 for engagement with a notch to retain each fork in fixed position laterally with respect to the lift member 84 by locking the same in such notch. An appropriate spring (not shown) may, if desired, be employed for causing pin 130 or the equivalent mechanism to be retained in position within the notch 129 in which the same is positioned. Therefore, it should be apparent from FIG. 9 that each of the forks 147 may be moved relative to the lift member 84 for permitting adjustment of the spacing between the fork, as well as relative lateral positioning of each fork with respect to the truck, as for permitting lifting of palletized different loads of different widths or dimensions. Thus, the arrangement for securing the upright portions of each fork to the lateral lift support members 84,85 carried by the yoke 95 is such as to provide releasable interengagement of the fork with respect to such members. This permits not only lateral positioning of the forks as noted, but also permits facile removal of the forks from the truck if desired as, for example, when they are not needed.

In view of the foregoing, it will be appreciated that the fork lift mechanism is secured to the new truck in the manner in which essentially places the mechanism, including the hydraulic cylinder, in essential alignment with respect to the rear wheels 23. This obviates any excess bending moment rearward of the truck in response to lifting of heavy loads by the forks thereby increases the capability of the truck to lift relatively heavy loads, considering its small and essentially very compact size.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A small, compact industrial fork lift truck comprising a chassis, a power unit at the front of said chassis including a steerable drive wheel under said power unit, a pair of nonsteerable wheels at the rear of said chassis, a platform at the rear of said chassis for standing of an operator while operating said truck, said platform being rearward of said power unit, a steering control interconnected with said drive wheel and accessible by said operator, said steering control comprising a steering arm extending from said power unit toward said platform, said power unit comprising a motor and drive wheel unit mounted for rotation about an axis vertical to said chassis, said steering arm being swingable about said axis for steering said drive wheel, a fork lift assembly carried at the rear of said chassis having a pair of forks extending rearwardly from said chassis for lifting palletized loads, fork actuation means for selectively raising and lowering said forks, coupler means carried at least at one end of said chassis for coupling a trailer to said truck independently of said fork lift assembly, and control means accessible to said operator from said platform for controlling movement of said truck and raising and lowering of said forks, said control means comprising first and second sets of controls each adapted for operating said fork actuation means to control raising or lowering movement of said forks, said first set of controls being carried by said arm and said second set of controls being carried at the rear of said truck for accessibility when said operator faces rearwardly on said platform, and a high speed control accessible only at said platform and operable by said operator when standing upon said platform for effecting high speed movement of said truck.

2. An industrial fork lift truck as defined in claim 1 and further characterized by said motor comprising an electric motor, said truck further comprising a battery unit interposed between said power unit and said platform for powering said motor.

3. An industrial fork lift truck as defined in claim 1 and further characterized by said control means comprising a third set of controls carried by said steering arm for operating said power unit to effect forward and backward movement of said truck.

4. An industrial fork lift truck as defined in claim 3 and further characterized by said control means comprising a first braking control operable by raising and lowering of said steering arm.

5. An industrial fork lift truck as defined in claim 4 and further characterized by said control means comprising a second braking control independent of said steering arm and constituting a pedal carried on said platform.

6. An industrial fork lift truck as defined in claim 5 and further characterized by said pedal being adapted to provide braking dependent upon weight of said operator applied thereto.

7. An industrial fork lift truck as defined in claim 1 and further characterized by said high speed control comprising a first control device carried on said platform for foot actuation by said operator when facing forward on said platform and a second control device for actuation by said operator when facing rearward on said platform.

8. An industrial fork lift truck as defined in claim 7 and further characterized by said second set of controls and said second control device each comprising switch pushbuttons and means housing said pushbuttons at the rear of said platform.

9. An industrial fork lift truck as defined in claim 1 and further characterized by said arm being pivoted for movement in a vertical plane from a first position extending toward said platform for use by said operator when upon said platform to a second position extending outwardly from the front of said truck for use by said operator when not upon said platform.

10. An industrial fork lift truck as defined in claim 1 and further characterized by said coupler means comprising a pair of arms each pivotally connected at one end to said chassis at the rear of said truck, said arms converging at pivot-remote ends, and a trailer coupler carried proximate the pivot-remote ends, said arms and coupler being swingable from a raised position in which said arms and coupling extend upward from the rear of said truck to a lowered position extending rearwardly from said truck and presenting said coupler for coupling of a trailer thereto.

11. An industrial fork lift truck as defined in claim 10 and further characterized by said forks being spaced apart at the rear of said truck, said arms being pivotally connected to said chassis at pivots spaced between said forks.

12. An industrial fork lift truck as defined in claim 11 and further characterized by said coupler means including a plate, said plate having a lower end secured to the pivot-remote ends of said arms and an upper end carrying said coupler, said arms lying in a generally horizontal plane when extending rearwardly from said truck, said plate lying in a generally vertical plane, whereby said coupler is offset from the plane of said arms.

13. An industrial fork lift truck as defined in claim 11 and further characterized by a further coupler means, including a coupler carried at the other end of said chassis, whereby couplings are provided at each end of said truck.

14. An industrial fork lift truck as defined in claim 1 and further characterized by said coupler means being located at the front of said truck, said chassis having a rounded front, said coupling means comprising first and second extension elongated members each secured at one end to said front on a respective opposite side of said front and projecting forward therefrom, first and second upright members having lower ends secured to the respective forward ends of said extension members, a bridging member interengaging the upper ends of said upright members, and a coupler carried at the midpoint of said bridging member and extending forwardly therefrom.

15. An industrial fork lift truck as defined in claim 1 and further characterized by said fork actuation means comprising a hydraulic cylinder secured to said chassis and including an actuator extendable from said cylinder in response to hydraulic fluid supplied to said cylinder, said cylinder being oriented for upward extension of said actuator from said cylinder, a yoke carried by said actuator, and means for securing said forks to said yoke.

16. An industrial fork lift truck as defined in claim 15 and further characterized by said hydraulic cylinder being secured to said chassis substantially in transverse alignment with said nonsteerable wheels.

17. An industrial fork lift truck as defined in claim 15 and further characterized by said fork lift assembly comprising a pair of parallel frame rails on opposite sides of said hydraulic cylinder, said rails each extending upward from said chassis, means associated with each rail for defining a channel along each rail, said yoke having rollers at opposite sides thereof, said rollers being received within said channels for guiding and supporting said yoke against loads imposed thereon by loads carried by said forks.

18. An industrial fork lift truck as defined in claim 15 and further characterized by said yoke having at least one lifting member, said means for securing said forks comprising means for releasably engaging said lifting member to permit facile removal of said forks from said truck.

19. An industrial fork lift truck as defined in claim 15, and further characterized said yoke carrying a first elongated horizontal member, said forks each being defined by an L-shaped member having a horizontal portion lifting an upright portion, a second elongated horizontal member carried by said yoke below said first member, and means for releasably interconnecting said forks with said first and second elongated members.

20. An industrial fork lift truck as defined in claim 19 and further characterized by said means interconnecting said forks with said first and second elongated members comprising a lip of said first elongated member extending upward along a length of said first elongated member and a corresponding lip carried by said upright portion of each yoke, the last-said lip extending downward along a length of said first elongated member, said lips being interengageable for supporting said upright portion from said first elongated member.

21. An industrial fork lift truck as defined in claim 20 and further characterized by said second elongated member comprising a lip extending downward along a length thereof, said upright portion of each yoke carrying a corresponding lip extending upward along a length of said second member, the latter of said lips being engageable for securing said upright portion to said second member.

22. An industrial fork lift truck as defined in claim 20 and further characterized by said lip of said first member including a plurality of slots along said length of said first member, said upright portion of each yoke comprising means for releasably extending into at least one of said slots for maintaining said upright portion laterally fixed with respect to said first elongated member.

* * * * *